UNITED STATES PATENT OFFICE.

MERILLE W. BEIQUE, OF COLORADO SPRINGS, COLORADO.

COMPOSITION OF MATTER.

No. 834,252.

Specification of Letters Patent.

Patented Oct. 30, 1906.

Application filed July 5, 1906. Serial No. 324,736.

*To all whom it may concern:*

Be it known that I, MERILLE W. BEIQUE, a citizen of the United States, residing at Colorado Springs, in the county of El Paso and State of Colorado, have invented a new and useful Composition of Matter to be Used for the Making of Mortar for Plastering, Stone-Laying, and Bricklaying, of which the following is a specification.

My composition consists of the following ingredients, which for use as plastering-mortar are to be combined in the following proportions: unslaked lime, one hundred pounds; plaster-of-paris, two hundred pounds; ore tailings of ore which has been treated by the cyanid process, two thousand pounds.

The unslaked lime is first pulverized or ground in some suitable way. The ingredients are then to be thoroughly mixed and water added until the mortar is of the proper consistency to be applied in the usual manner. If desired, hair or fiber may be added to mortar to be used for the scratch coat, as is frequently done with ordinary lime mortar or with various hard plaster combinations.

In my composition the use of cyanid ore tailings is the important and novel feature. I am aware of the use of lime, both slaked and unslaked, for mortar, in combination with ordinary sand, and also that plaster-of-paris and lime are much used together for plastering material. I am not aware, however, of their use in combination with cyanid ore tailings. In the cyanid ore tailings there remains a residue of the chemicals used in the extraction of the mineral, including cyanid of potassium, lime, &c., together with various chemical compounds resulting from the chemical reactions which occur during various stages of the extraction of the mineral. Cyanid ore tailings also possess to a marked degree a porousness or harshness not found in ordinary sand or in ore tailings produced in any other way or by any other treatment, and this feature gives it additional value for use in combination with the other elements with which I combine it.

If desired, the lime before being mixed with the other ingredients may be softened by carefully spraying or dampening it until the lumps are entirely reduced; but care must be used to prevent the lime from burning. This process of reducing the lime should be used only when no mechanical means is at hand for grinding the lime.

The formula above given is correctly proportioned for mortar to be used for plastering, although the exact proportions are not essential, a moderate variation of either or all of the ingredients not greatly affecting the result. For mortar to be used in masonry any desired amount of sand is to be added, according to the richness desired. In some cases, where the cyanid ore tailings contain an excess of slimes, it is necessary to add to the composition a quantity of common sand.

Having thus explained my invention, what I claim, and desire to secure by Letters Patent of the United States, is—

1. The herein-described composition of matter consisting of unslaked lime, plaster-of-paris and tailings from ore which has been treated by a cyanid process, all substantially as described and for the uses and purposes set forth.

2. The herein-described composition of matter consisting of unslaked lime, plaster-of-paris cyanid ore tailings, sufficient water for rendering of the proper consistency all as described and for the uses and purposes set forth.

3. The herein-described composition of matter consisting of unslaked lime, plaster-of-paris, cyanid ore tailings, water sufficient to render of consistency desired, hair or fiber, all substantially as described and for the uses and purposes set forth.

4. The herein-described composition of matter consisting of unslaked lime, plaster-of-paris, cyanid ore tailings, sufficient water to render composition of desired consistency and common sand to overcome excess of slimes in cyanid ore tailings, all substantially as described and for the uses and purposes set forth.

5. The herein-described composition of matter for plastering consisting of unslaked lime one hundred pounds, plaster-of-paris two hundred pounds, and cyanid ore tailings two thousand pounds, substantially as described and for the uses and purposes set forth.

6. The herein-described composition of matter consisting of unslaked lime one hundred pounds, plaster-of-paris two hundred pounds, cyanid ore tailings two thousand pounds, sufficient water to render of desired consistency and common sand to reduce the composition to the desired degree of richness, all substantially as described and for the uses and purposes set forth.

In testimony whereof I have signed my name to this specification in the presence of two subscribing witnesses.

MERILLE W. BEIQUE.

Witnesses:
 ELFY McKESSON,
 J. W. CAMPBELL.